(12) United States Patent
Litovtchenko et al.

(10) Patent No.: US 7,984,210 B2
(45) Date of Patent: Jul. 19, 2011

(54) METHOD FOR TRANSMITTING A DATUM FROM A TIME-DEPENDENT DATA STORAGE MEANS

(75) Inventors: Vladimir Litovtchenko, Munich (DE); Dirk Moeller, Munich (DE); Christoph Patzelt, Assling (DE)

(73) Assignee: Freescale Semiconductor, Inc., Austin, TX (US)

( * ) Notice: Subject to any disclaimer, the term of this patent is extended or adjusted under 35 U.S.C. 154(b) by 199 days.

(21) Appl. No.: 12/304,197

(22) PCT Filed: Jun. 20, 2006

(86) PCT No.: PCT/EP2006/063369
§ 371 (c)(1),
(2), (4) Date: Dec. 10, 2008

(87) PCT Pub. No.: WO2007/147435
PCT Pub. Date: Dec. 27, 2007

(65) Prior Publication Data
US 2009/0327545 A1    Dec. 31, 2009

(51) Int. Cl.
*G06F 3/00* (2006.01)
*G06F 13/14* (2006.01)
(52) U.S. Cl. .......................................... 710/52; 710/305
(58) Field of Classification Search ............... 710/52–57, 710/305–307
See application file for complete search history.

(56) References Cited

U.S. PATENT DOCUMENTS

| | | | |
|---|---|---|---|
| 6,005,796 A * | 12/1999 | Sywyk et al. ................. | 365/156 |
| 6,141,703 A | 10/2000 | Ding et al. | |
| 6,185,640 B1 * | 2/2001 | Ross ................................ | 710/53 |
| 6,209,047 B1 * | 3/2001 | Kim ................................ | 710/57 |
| 6,237,066 B1 * | 5/2001 | Pan et al. ........................ | 711/149 |
| 6,243,769 B1 * | 6/2001 | Rooney ........................... | 710/56 |
| 6,256,699 B1 | 7/2001 | Lee | |
| 6,263,384 B1 * | 7/2001 | Yanase ........................... | 710/53 |
| 6,816,929 B2 * | 11/2004 | Ueda ............................... | 710/56 |
| 7,539,791 B2 * | 5/2009 | Wu et al. ........................ | 710/52 |
| 2001/0056513 A1 * | 12/2001 | Ueda ............................. | 710/100 |
| 2003/0105798 A1 | 6/2003 | Kim et al. | |
| 2003/0172231 A1 | 9/2003 | Ebergen | |

(Continued)

FOREIGN PATENT DOCUMENTS
EP    1624620 A    2/2006

OTHER PUBLICATIONS

STMicroelectronics; "Programming ST10X167/ST10F168 CAN interrupt drivers"; Application Note 1998.

(Continued)

*Primary Examiner* — Christopher B Shin

(57) ABSTRACT

A method of transmitting a datum from a time-dependent data storage means, the datum being that most recently acquired before the occurrence of an allocated transmission slot; the method comprising the steps of: writing a first acquired datum to a first side of the data storage means; transferring the first datum to a second side of the data storage means; and writing a next datum, acquired before the occurrence of the next allocated transmission slot, to the first side of the data storage means; wherein the method further comprises the step of: replacing the first acquired datum in the second side of the data storage means with the next acquired datum; and transmitting the next acquired datum from the data storage means at the next allocated transmission slot.

20 Claims, 4 Drawing Sheets

U.S. PATENT DOCUMENTS

| | | | |
|---|---|---|---|
| 2004/0117532 | A1 | 6/2004 | Bennett et al. |
| 2004/0208181 | A1 | 10/2004 | Clayton et al. |
| 2005/0091427 | A1 | 4/2005 | Yoshida et al. |
| 2005/0157709 | A1 | 7/2005 | Lin |
| 2008/0140949 | A1* | 6/2008 | Hartwich et al. ............. 711/154 |
| 2008/0162763 | A1 | 7/2008 | Bney-Moshe |
| 2008/0189451 | A1* | 8/2008 | Isono et al. ..................... 710/52 |
| 2008/0256320 | A1* | 10/2008 | Hartwich et al. ............. 711/173 |
| 2008/0282041 | A1* | 11/2008 | Hartwich et al. ............. 711/147 |
| 2009/0083466 | A1* | 3/2009 | Hartwich et al. ............. 710/112 |
| 2009/0119425 | A1* | 5/2009 | Litovtchenko et al. ......... 710/55 |
| 2009/0150607 | A1* | 6/2009 | Krantz et al. ................ 711/113 |
| 2009/0282179 | A1* | 11/2009 | Patzelt et al. ................ 710/262 |
| 2009/0300254 | A1* | 12/2009 | Newald et al. ................ 710/305 |
| 2009/0327545 | A1* | 12/2009 | Litovtchenko et al. ....... 710/105 |
| 2010/0064082 | A1 | 3/2010 | Ihle et al. |
| 2010/0161834 | A1* | 6/2010 | Newald et al. .................... 710/8 |

OTHER PUBLICATIONS

Stranko, T.A., "Enhanced Sensor Tracking," IBM Technical Disclosure Bulletin, IBM Corp., vol. 25, No. 78, Dec. 1982, pp. 3665-3667.

Non-Final Office Action mailed Jul. 7, 2010 for U.S. Appl. No. 12/305,328, 10 pages.

Non-Final Office Action mailed Dec. 9, 2010 for U.S. Appl. No. 12/305,328, 8 pages.

* cited by examiner

METHOD FOR TRANSMITTING A DATUM FROM A TIME-DEPENDENT DATA STORAGE MEANS

FIELD OF THE INVENTION

This invention relates to a method and system for transmitting a datum, and in particular, a method and system of transmitting a datum from a time-dependent data storage means.

BACKGROUND OF THE INVENTION

FlexRay is a communication protocol developed by a consortium of automotive manufacturers and semiconductor companies to provide a distributed control and communication system for automotive applications.

FlexRay systems comprise a plurality of buffers, wherein these buffers are configured as double buffers. Double buffers are prone to blocking which limit their use for storing and transmitting data from real-time applications. Solutions to this limitation are constantly being sought.

United States Patent Application US2004208181 describes a network computer system in which the computers transmit messages over virtual circuits established thereamong, wherein the messages are transmitted in a round-robin scheduling arrangement. However, US2004208181 does not describe the dedicated bus systems of the FlexRay protocol. Furthermore, US2004208181 does not describe the transmission of data from real-time applications. Similarly, US2004208181 does not describe the discarding of obsolete frames.

US Patent Application US20050091427 describes an integrated circuit device having a send/receive macro for serially transferring addresses and data to or from an external device via a serial transfer bus. In this case, the host CPU interrupt load is decreased by implementing a block which controls data transmission and monitors the data transmission status. This block has its own FIFO buffer where it stores data provided by the host CPU. The host is interrupted only if data transmission was not acknowledged. However, in contrast with the present invention, the invention described in US20050091427 utilizes FIFO therefore no transmission done event is sent to the host, but only FIFO is empty interrupt or the data is not acknowledged.

US Patent Application US20050157709 describes a multi-queue single-FIFO scheme for quality of service oriented communication. In this case, the host CPU interrupt load is reduced by implementing an arbiter which maintains data transmission operations on the physical medium from the connected Multi-queue single-FIFO. However, in contrast with the present invention, the invention described in US20050157709 relates to an architecture based on a FIFO. In particular, it does not relate to the double buffers of the present invention.

Similarly, "Programming ST10X167/ST10F168 CAN interrupt drivers" Application Note, 1998 STMicroelectronics, discusses host CPU programming approaches utilizing single buffers for transmission which has combined event and state interrupts for transmit buffers in a CAN communication system. However, this document does not relate to FIFO systems or double buffers.

SUMMARY OF THE INVENTION

The present invention provides a method and system for transmitting a datum as provided in the accompanying Claims.

BRIEF DESCRIPTION OF THE DRAWINGS

FIG. 1b is a block diagram of an electronic control unit shown in FIG. 1a;

DETAILED DESCRIPTION OF THE PREFERRED EMBODIMENTS

In the following description, the FlexRay protocol is used for example purposes only, to demonstrate the operation of the method and system for transmitting a datum in accordance with the invention. In particular, it will be understood that the present invention should not be construed as being limited to the FlexRay protocol.

Figure 1A:
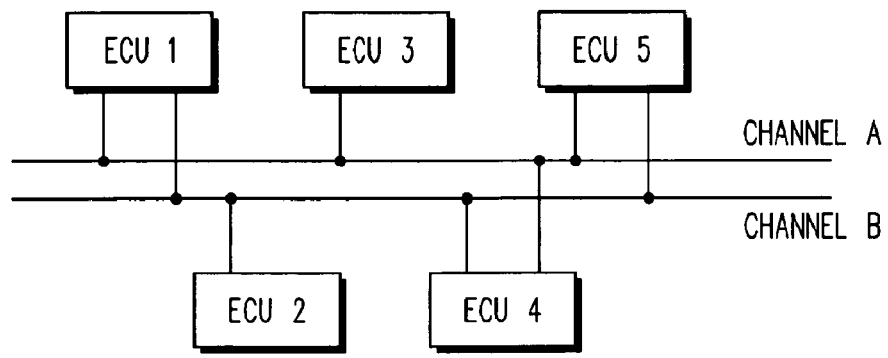
FIG. 1a is a block diagram of a topology of electronic control units in a FlexRay system.
Figure 1B:
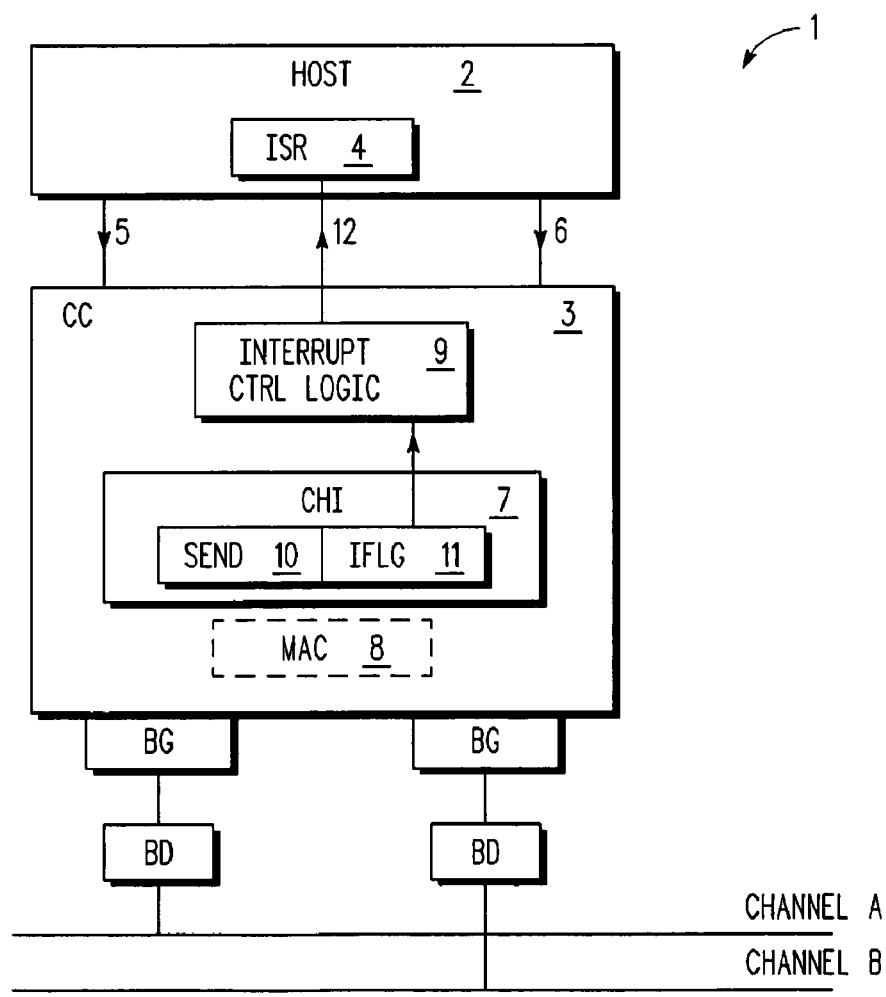

Referring to FIG. 1a, a FlexRay system comprises several electronic control units ($ECU_1$-$ECU_5$) connected to one or two communication channels (channel A and/or channel B). Referring to FIG. 1b, an ECU 1 comprises inter alia a host processor 2, a communication controller 3, a bus driver (BD) and, optionally, a bus guardian (BG). The host processor 2 comprises an interrupt services routine or embedded software 4 which services interrupts from the communication controller 3 independently of the interrupt type.

In use, the host processor 2 transmits data 5 and configuration information 6 to the communication controller 3, which transmits the data 5 onto the communication channel(s) (channel A and/or channel B). To this end, the communication controller 3 comprises a controller host interface (CHI) 7, a media access controller (MAC) 8 and an interrupt control logic unit 9. The controller host interface 7 comprises a plurality of buffers that include at least one send buffer 10. The send buffer(s) 10 are each provided with an interrupt generator 11 and are connected to a one or more host processor interrupt lines 12.

Figure 2:
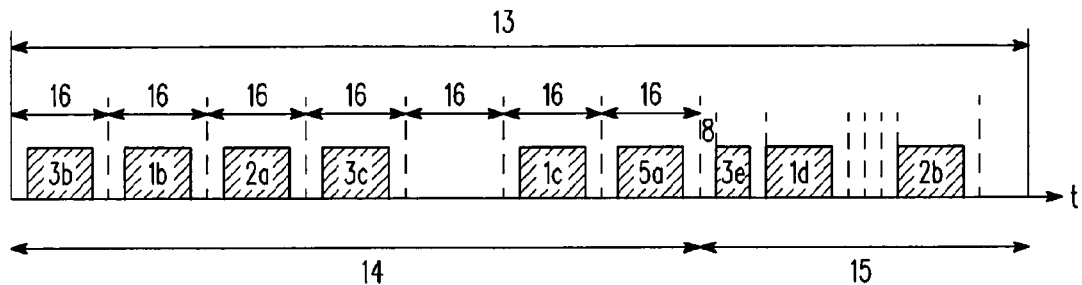
FIG. 2 is a block diagram of the timing scheme used for transmitting messages in the FlexRay system.

Referring to FIG. 2, the communication channels support data transfer rates up to 10 Mbits/sec and enable communication in recurring communication cycles. A communication cycle 13 comprises a static segment 14 and a dynamic segment 15. The static segment 14 employs time division multiple access (TDMA) to restrict the ability of an ECU to transmit data to specifically designated time intervals known as time slots 16. Messages are communicated from ECUs in the form of data frames, wherein only a single frame may be transmitted during a given time slot 16.

Returning to FIG. 1b, in use, the host processor 2 informs the communication controller 3 of the time slots it has been allocated. At each time slot, the media access controller 8 checks whether an ECU is allowed to transmit a message. If an ECU is allowed to transmit a message, the media access controller 8 imports data from the send buffer(s) 10 and generates a frame therefrom. The media access controller 8 then transmits the frame on the communication channels (channel A and/or channel B). Whilst waiting for the next available time slot, data is stored in the send buffer(s) 10. To this end, a send buffer 10 can store up to 254 bytes of payload data.

Figure 3:
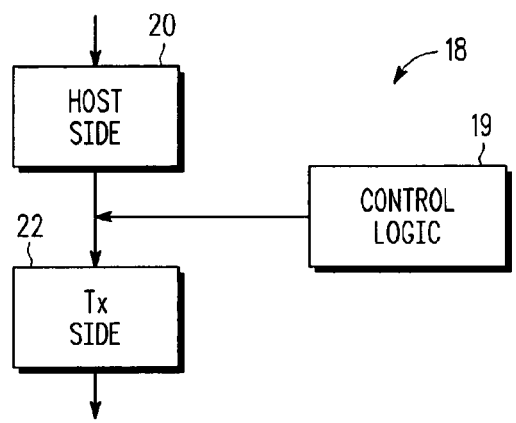
FIG. 3 is a block diagram of a traditional double buffer arrangement in a FlexRay system.

The host processor 2 can configure some send buffer(s) 10 to be double buffers. Referring to FIG. 3 in combination with FIG. 1b, a conventional double buffer 18 can be considered as a FIFO buffer of depth two, wherein the buffer 18 is divided into two partial buffers of equal length which operate under the control of a control logic unit 19. The two partial buffers are respectively known as a host-side buffer 20 and a transmit-side buffer 22. Once data have been written to a transmit-side buffer 20, the data are no longer under the control of the host processor 2. For example, the host processor 2 cannot retrieve or remove data written to the transmit-side buffer 22 until it is transmitted by the communication controller 3 on the communication channels (channel A and/or channel B).

As a result, data most recently acquired by an ECU may not be transmitted thereby. Instead, the only data transmitted is that loaded into the transmit-side of the double buffer(s) (i.e. send buffer(s) 10) at a given time slot. However, in some cases (e.g. real-time measuring systems) it is desirable to transmit the data most recently acquired by the host processor 2. This is particularly problematic if a host processor 2 acquires data faster than the communication controller 3 can transmit the data from the double buffer(s) (i.e. send buffer(s) 10).

A send buffer 10 also stores data provided by the communication controller 3 for transmission to the host processor 2. This data comprises information about the transmission process and status information about the time slot in which data was transmitted. The data is stored in inter alia the interrupt generator 11. In use, each send buffer(s) 10 informs the host processor 2 about its event and state changes by asserting its interrupt generator 11.

More specifically, during a transmission, the communication controller 3 generates two types of interrupts, namely an event interrupt (which indicates that a transmission is finished) and a state interrupt (which indicates that the send buffer 10 requires update from the host processor 2). In use, both types of interrupt are combined into an interrupt signal which is transmitted to the host processor 2. On receipt of an interrupt signal, the interrupt service routine 4 must determine the cause of the interrupt signal. In other words, the interrupt service routine or embedded software 4 must determine whether a particular interrupt signal comprises a state interrupt or an event interrupt.

A. First Embodiment: Non-Blocking Double Buffer

Figure 4:
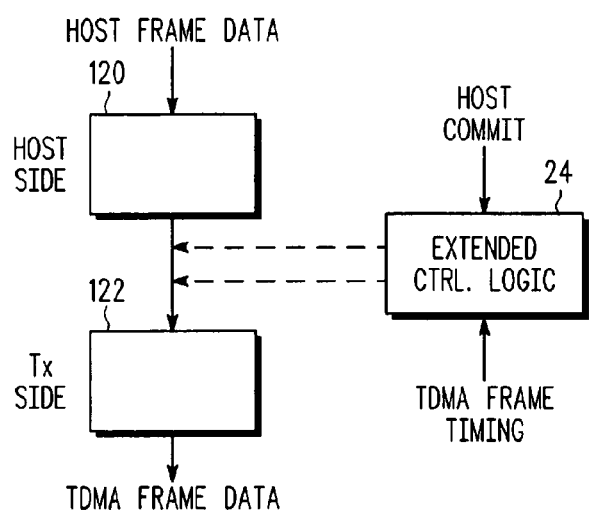
FIG. 4 is a block diagram of a non-blocking double buffer in accordance with the first embodiment of the invention given by way of example.

Referring to FIG. 4, the non-blocking double buffer in accordance with the present invention comprises a host-side buffer 120, a transmit-side buffer 122 and an extended control logic unit 24. The extended control logic unit 24 starts working each time new data are stored in the host-side buffer 120.

Depending on the state of the transmit-side buffer 122, new data may be written into it, replacing previously stored data that have not been sent already. However, if the transmit-side buffer 122 is transmitting data at the time, the new data is not written thereto at that moment. Instead, the transmit-side buffer 122 is updated immediately after the transmission has finished.

Figure 5:
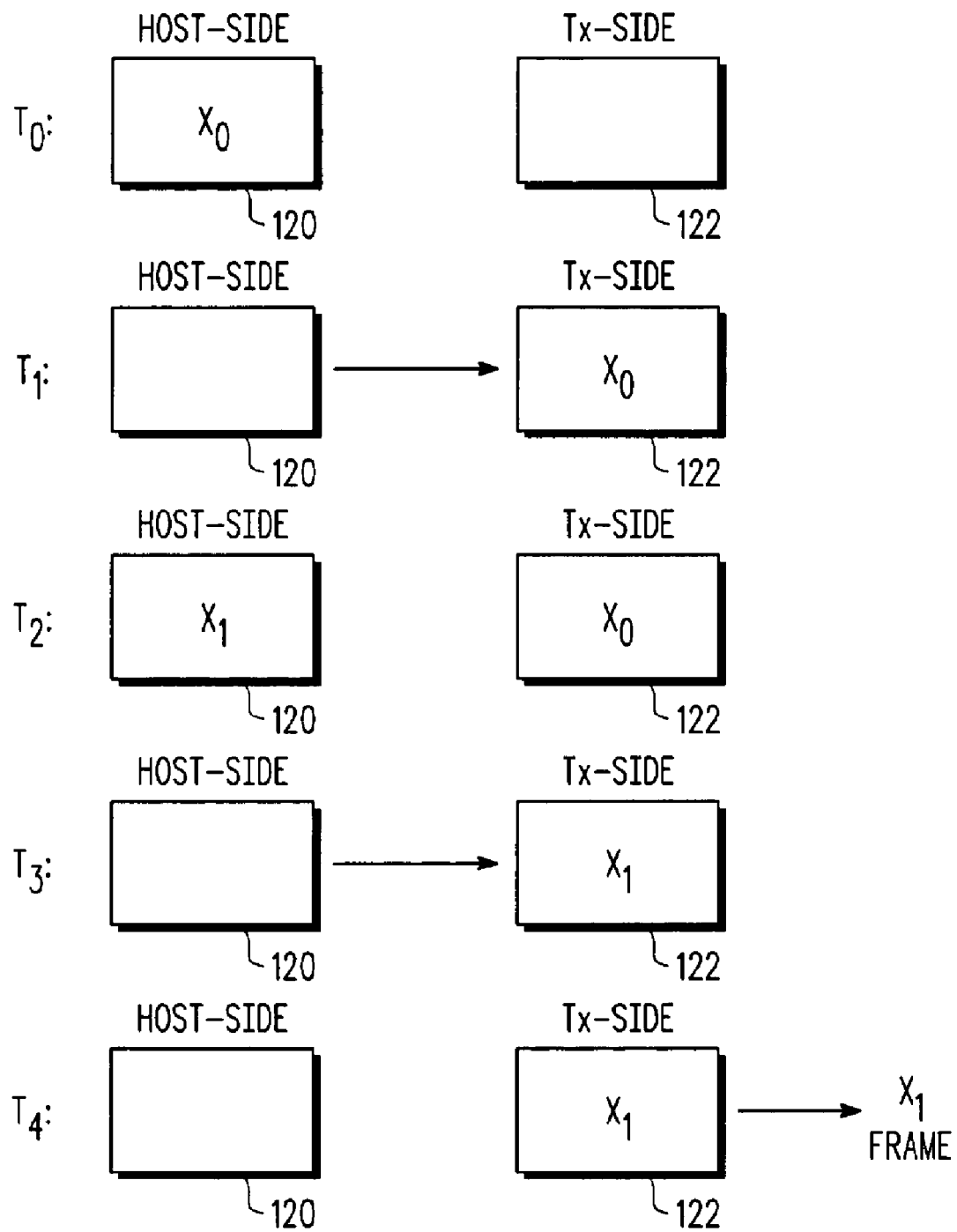
FIG. 5 is a block diagram showing the timing of the processes occurring in the non-blocking double buffer of FIG. 4 in accordance with one embodiment of the invention given by way of example.

Referring to FIG. 5, consider a series of data measurements $X_0$-$X_n$ acquired during a same time slot of a communication cycle. At a first time $T_0$, a data measurement $X_0$ is stored in the host-side buffer 120 (and the transmit-side buffer 122 is empty). At a second time thereafter $T_1$, the data measurement $X_0$ is transferred to the transmit-side buffer 122. At the next time $T_2$, a new data measurement $X_1$ is stored in the host-side buffer 120.

In a prior art double buffer, if the above situation occurred, since the data measurements $X_0$ and $X_1$ were acquired during the same communication cycle time slot, $X_0$ would not been transmitted from the transmit-side buffer 122 at the time $X_1$ was acquired. Further, $X_0$ could not be removed from the transmit-side buffer 122 and must be retained therein until the next available transmission time slot. Thus, in effect, the transmission of the most recent data measurement $X_1$ at the next available time slot is blocked, insofar as $X_1$ cannot be placed in the transmit-side buffer 122 instead of $X_0$.

However, with the extended control logic unit 24 of the present invention, at later time $T_3$, $X_1$ is transferred from the host-side buffer 120 to the transmit-side buffer 122. Thus, the transmission of measurement data $X_1$ is no longer blocked, so that, at later time $T_4$ (i.e. at the next available time slot), a frame (comprising the most recently acquired measurement data $X_1$) is transmitted from the ECU.

The host processor can store (in the transmit side buffer 120) an arbitrary number of new data measurements that replace a previously stored data measurement until the next allocated transmission time slot. However, if a one or more data measurements are acquired in the time interval between allocated time slots, the present invention transmits only the most recently acquired data measurement.

Accordingly, the present invention is an extension of the FIFO concept of traditional double-buffer systems, which enables the most recently acquired data to be transmitted in a specific time slot, regardless of how many messages have been stored in the send buffer since the last transmission. Thus, the present invention enables multiple storages of frames by a host processor independently of the TDMA timing of the FlexRay protocol.

As a result, the present invention allows the complete decoupling of measurement systems etc. from the TDMA timing mechanism of the FlexRay protocol. The present invention shifts the burden of synchronising data transmission with TDMA timing from the host processor to the double-buffer control logic.

Accordingly, the present invention is particularly useful in real-time systems that generate measurement data at a rate that differs from the TDMA timing of the FlexRay protocol. The present invention is particularly useful insofar as it avoids the need for special adaptations to the FlexRay system to accommodate real-time applications running on the host processor.

B. Second Embodiment: Grouping Interrupts According to their Interrupt Type

In time-critical applications, it is desirable to reduce the load of a host processor by grouping interrupts according to their source. In effect, separating event and state change interrupts decreases the amount of processing an interrupt service routine (ISR) must perform on the interrupt signal, since such grouping enables the host processor to use specific interrupt processing routing or embedded software dedicated to a particular interrupt type.

Figure 6:
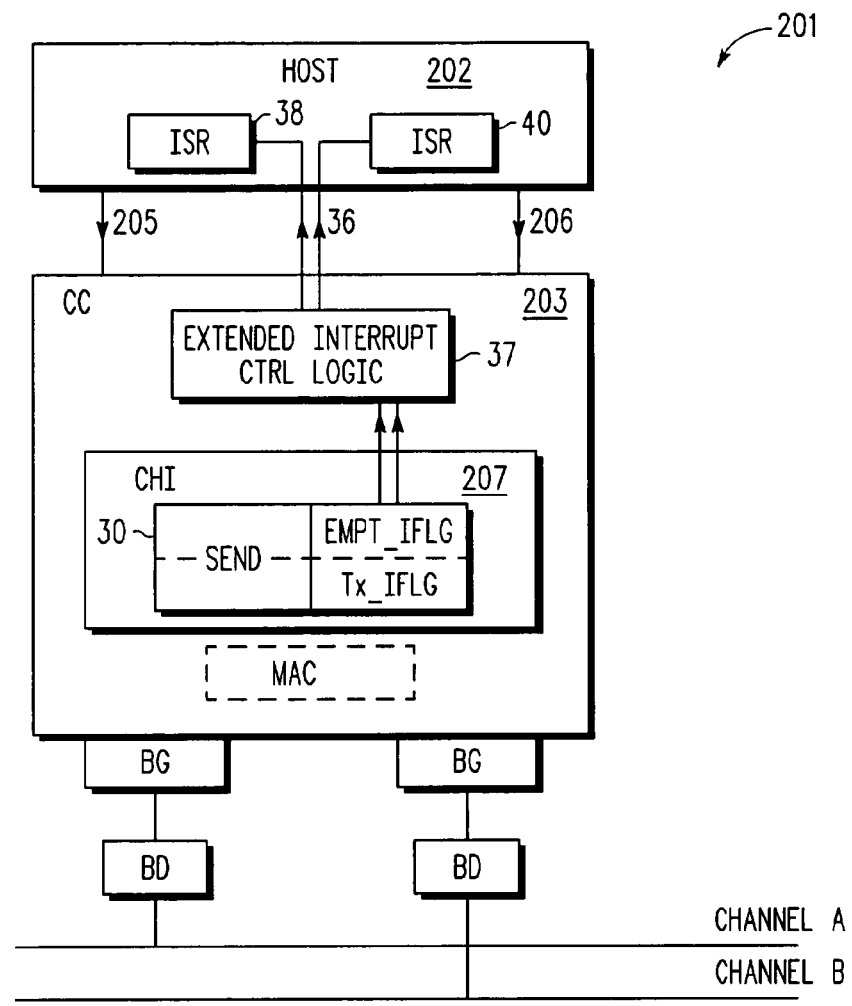
FIG. 6 is a block diagram of an ECU in accordance with the second embodiment of the invention given by way of example.

Referring to FIG. 6, an ECU 201 employing the system for grouping interrupts comprises a host processor 202 and a communication controller 203 as before. The communication controller 203 comprises a controller host interface 207 and at least one send buffer 30 that has been configured as a double buffer.

Figure 7:
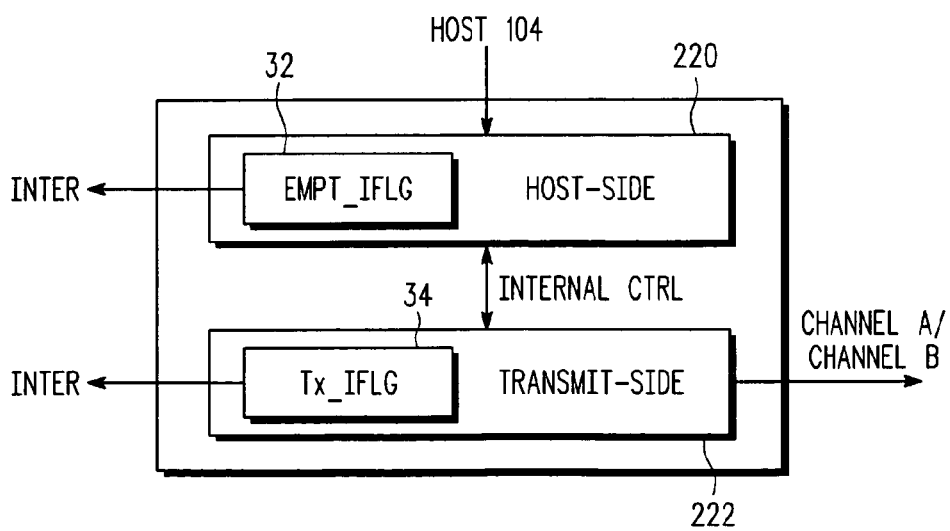
FIG. 7 is a block diagram of a double-buffer in accordance with the second embodiment of the invention given by way of example.

Referring to FIG. 7 in combination with FIG. 6, the host-side buffer 220 and the transmit-side buffer 222 are each provided with their own interrupt generator bits 32, 34. The interrupt generator bits 32, 34 are distinct and have different functions. This contrasts with prior art systems in which the interrupt functions of the host-side buffer and the transmit-side buffer, are combined into a single interrupt generator bit. In keeping with this principle, the interrupt generator bits 32, 34 are connected by one or more host processor interrupt lines 36 (through an extended interrupt control logic unit 37) to a one or more interrupt services routines 38, 40 in the host processor 202.

The interrupt generator bit 32 for the host-side buffer 220 is an Empt_IFLG. In use, this flag bit does not necessarily cause an interrupt (because it could be masked out). However, if the interrupt generator bit 32 is asserted and its utilization as an interrupt source is enabled, it generates an interrupt which indicates to the host processor 202 that the host-side buffer 220 requires updating by the host processor 202. Such need for updating occurs when:

(a) the send buffer 30 has just been initialized (i.e. so it holds no data to be transmitted); or (b) the communication controller 203 has delivered a frame from the host-side buffer 220 to the transmit-side buffer 222, so that host processor 202 can now write new data to the host-side buffer 220; or, optionally, (c) the data transmission status of the send buffer 30 was updated by the communication controller 203.

The interrupt generator bit 34 for the transmit-side buffer 222 is a Tx_IFLG bit which in use does not necessarily cause an interrupt (because it could be masked out). However, when asserted and its utilization as an interrupt source is enabled, the interrupt generator bit 34 generates an interrupt which indicates to the host processor 202 that the data in the transmit-side buffer 222 was transmitted onto the communication channels (channel A and channel B) and the communication controller 203 has updated the data transmission status fields of the double buffer 30.

The extended interrupt control logic block 37 receives the interrupts (generated by the asserted interrupt generator bits 32, 34) and groups the interrupts according to their type. This grouping is performed in accordance to the origin of the interrupt (i.e. whether it is from the host-side or transmit-side of the double buffer 30). The grouped interrupts are transmitted to the host processor 202 where they can be processed by ISRs or embedded software 38, 40 so that each ISR or embedded software 38, 40 processes the interrupts from only one group. This enables the host to dedicate ISR or embedded software 38, 40 for processing the interrupts of that group.

Thus, the interrupt grouping scheme of the present invention enables the host processor 202 to use interrupt processing routines dedicated to a particular interrupt type. The present invention also decreases the number of interrupt services routine instructions for the host processor 202 embedded software.

Furthermore, the interrupt grouping scheme of the present invention provides the possibility of tracking bus events and transmitting same to the host processor during a transmission. Similarly, the present invention enables repetitive transmission of the same data stored in the send buffer 30 in several communication cycles whilst tracking the events.

Modifications and alterations may be made to the above without departing from the scope of the invention.

The invention claimed is:

1. A method of transmitting datum from a time-dependent data storage system, the method comprising the steps of:
    transmitting a first datum from a first buffer of the time-dependent data storage system at an occurrence of a first allocated transmission slot;
    writing a second datum to a second buffer of the time-dependent data storage system at the occurrence of the first allocated transmission slot;
    transferring the second datum to the first buffer of the time-dependent data storage system before an occurrence of a second allocated transmission slot;
    writing a third datum, acquired before the occurrence of the second allocated transmission slot, to the second buffer of the time-dependent data storage system;
    replacing the second datum in the first buffer of the time-dependent data storage system with the third datum stored at the second buffer before the occurrence of the second allocated transmission slot; and
    transmitting the third datum from the data storage system at the second allocated transmission slot.

2. The method as claimed in claim 1, wherein the method is operated within a time division multiple access protocol.

3. The method as claimed in claim 1, wherein the method is operated within the FlexRay (trademark) protocol.

4. A time-dependent data storage system comprising:
    a logic unit; and
    a double buffer in communication with the logic unit, the double buffer adapted to transmit a first datum from a transmit-side of the double buffer at an occurrence of a first allocated transmission slot, to write a second datum to the transmit-side of the double buffer whilst waiting for a second allocated transmission slot, and to write a third datum, subsequently acquired whilst waiting for the second transmission slot, to a host-side of the double buffer;
    wherein the logic unit is adapted to transfer the second datum from the host-side to the transmit-side whilst waiting for the second allocated transmission slot, and the second datum is transmitted from the transmit-side upon the occurrence of the second allocated transmission slot.

5. The system of claim 4 wherein the system operates in accordance with a time division multiple access protocol.

6. The system of claim 4 wherein the system operates in accordance with the FlexRay (trademark) protocol.

7. The method as claimed in claim 2, wherein the method is operated within the FlexRay (trademark) protocol.

8. The system of claim 5 wherein the system operates in accordance with the FlexRay (trademark) protocol.

9. A method comprising:
    transmitting a first datum from a transmit-side of a double buffer at an occurrence of a first allocated transmission slot;
    writing a next datum of a plurality of second datum to a host-side of the double buffer at the occurrence of the first allocated transmission slot;
    transferring the next datum of the plurality of second datum from the host-side to the transmit-side before an occurrence of a second allocated transmission slot;
    writing each datum of the plurality of second datum sequentially to the host-side of the double buffer before the occurrence of the second allocated transmission slot;
    replacing a previously acquired datum of the plurality of second datum in the transmit-side with a most recently acquired datum of the plurality of second datum stored at the host-side before the occurrence of the second allocated transmission slot; and transmitting the most recently acquired datum from the double buffer at the occurrence of the second allocated transmission slot.

10. The method as claimed in claim 9, wherein the method is operated within a time division multiple access protocol.

11. The method as claimed in claim 10, wherein the method is operated within the FlexRay (trademark) protocol.

12. The method as claimed in claim 9, wherein the method is operated within the FlexRay (trademark) protocol.

13. The method of claim 9, wherein a current datum in the transmit-side buffer is transmitted from the data storage system at an occurrence of each allocated transmission slot.

14. The method of claim 1, wherein the time-dependent data storage system includes a double buffer.

15. The method of claim 14, wherein the first buffer is a transmit-buffer of the double buffer.

16. The method of claim 14, wherein the second buffer is a host-side buffer of the double buffer.

17. The method of claim 1, wherein a current datum in the first buffer is transmitted from the data storage system at an occurrence of each allocated transmission slot.

18. The method of claim 1, wherein each new datum written into the second buffer before the occurrence of each allocated transmission slot replaces a current datum written in the first buffer.

19. The system of claim 4 wherein a current datum in the transmit-side buffer is transmitted from the data storage system at an occurrence of each allocated transmission slot.

20. The system of claim 4 wherein each new datum written into the host-side buffer before the occurrence of each allocated transmission slot replaces a current datum written in the transmit-side buffer.

* * * * *